United States Patent [19]

Thomas

[11] Patent Number: 5,514,231
[45] Date of Patent: May 7, 1996

[54] PROCESS FOR PRODUCING MICROPOROUS PTFE

[75] Inventor: Thomas R. Thomas, Hart Village, England

[73] Assignee: British Technology Group Limited, London, England

[21] Appl. No.: 422,659

[22] Filed: Apr. 14, 1995

Related U.S. Application Data

[63] Continuation of Ser. No. 149,699, Nov. 9, 1993, abandoned, which is a continuation of Ser. No. 762,800, Sep. 20, 1991, abandoned, which is a continuation of Ser. No. 538,677, Jun. 15, 1990, abandoned, which is a continuation of Ser. No. 330,970, Mar. 30, 1989, abandoned, which is a continuation of Ser. No. 50,485, May 18, 1987, abandoned.

[30] Foreign Application Priority Data

May 29, 1986 [GB] United Kingdom .................... 8613015

[51] Int. Cl.$^6$ ....................................................... B27N 3/00
[52] U.S. Cl. ......................... 156/62.2; 156/73.6; 156/77; 156/83; 156/264; 264/41; 264/45.4; 264/127; 428/315.5; 521/56; 521/145; 521/919
[58] Field of Search .................... 156/62.2, 73.6, 156/77, 83, 264; 264/127, 45.4, 41; 428/315.5; 521/56, 145, 919

[56] References Cited

U.S. PATENT DOCUMENTS

| 3,015,855 | 1/1962 | Merkel | 264/127 |
| 3,953,566 | 4/1976 | Gore | 264/127 |

FOREIGN PATENT DOCUMENTS

| 468796 | 8/1975 | U.S.S.R. | 264/127 |

*Primary Examiner*—John J. Gallagher
*Attorney, Agent, or Firm*—Nixon & Vanderhye

[57] ABSTRACT

A substantially cylindrical bar of microporous PTFE is non-fibrillated and incorporates pores within any cylindrical surface within the bar centred about the central longitudinal axis of the bar that are of substantially uniform size and are substantially uniformly distributed within that surface. The process for producing such a bar includes the step of applying a substantially radial compressive force to pre-heated and cooled granules of PTFE and subsequently re-heating and cooling the compressed granules, while a film of non-fibrillated, microporous PTFE is formed from the cooled bar, the plane of the film being perpendicular to the direction of the radial compressive force whereby the pores within any plane substantially perpendicular to the thickness of the film are of substantially uniform size and are substantially uniformly distributed within that plane and all such parallel planes.

10 Claims, 1 Drawing Sheet

PROCESS FOR PRODUCING MICROPOROUS PTFE

This is a Rule 62 continuation of application Ser. No. 08/149,699, filed 9 Nov. 1993, now abandoned, which is a Rule 62 continuation of application Ser. No. 07/762,800, filed 20 Sep. 1991, now abandoned, which is a Rule 62 continuation of application Ser. No. 07/538,677, filed 15 Jun. 1990, now abandoned, which is a Rule 62 continuation of application Ser. No. 07/330,970, filed 30 Mar. 1989, now abandoned, which is a Rule 62 continuation of application Ser. No. 07/050,485, filed 18 May 1987, now abandoned.

BACKGROUND OF THE INVENTION

This invention relates to porous PTFE and a process of producing same.

The outstanding characteristics of PTFE, such as its chemical inertness, its resistance to corrosion, its dielectric properties and its low frictional properties have resulted in this material being used in many diverse applications.

However certain of the inherent characteristics of PTFE produced by established methods—such as the void-free nature of the material and its inability to adhere to other materials without etching, abrading or otherwise treating the PTFE—means that it is not suitable for use in, for example, diffusion or filtration processes where porous materials are required.

In particular, liquid and gasous diffusion processes such as plasma phoresis, renal dialysis, desalination of water and blood oxygenation, utilise thin porous membranes as the control element, the non-porous nature of established PTFE products preventing their use in such processes. Most such membranes are manufactured either from cellulose and its derivatives, or from such materials as ceramics, asbestos, glass, porcelain and metals. In the former case, the membranes produced are relatively mechanically weak, particularly when produced to achieve high flow rates therethrough and often require the addition thereto of mechanical supports. In the latter case, the membranes, although mechanically strong, are not as chemically inert as PTFE. Other plastics materials have been used, but these are invariably less chemically inert than PTFE and may also require mechanical support.

It has been proposed to produce porous PTFE membranes by means of various specialist processes such as by plasma desposition, by conventional compression moulding but at pressures lower than those normally recommended for the production of a void-free material, by paste-forming extrusion techniques and subsequent expansion by stretching, or by incorporating within the PTFE thermally or chemically degradable materials which can be leached out during the process to leave the desired voids. However, such processes can require the use of complex and therefore expensive equipment and often result in the production of relatively weak membranes, or membranes which, because they are thin, are difficult to handle.

SUMMARY OF THE INVENTION

It is an object of the invention to produce a porous yet strong PTFE which is easy to handle.

According to one aspect of the present invention, there is provided a substantially cylindrical bar of non-fibrillated, microporous PTFE the pores of which within any cylindrical surface contained within the bar and centred about the central longitudinal axis thereof are of substantially uniform size and are substantially uniformly distributed within that surface.

According to a further aspect of the present invention there is provided a film of non-fibrillated, microporous PTFE the pores of which within any plane substantially perpendicular to the thickness of the film are of substantially uniform size and are substantially uniformly distributed within that plane and all such parallel planes.

According to a still further aspect of the invention, there is provided a process for producing a bar of non-fibrillated, microporous PTFE having a substantially cylindrical outer surface thereto, the process comprising the steps of:

providing thermally and compressively untreated PTFE powder the particles of which are of irregular shape and are of a diameter within a predetermined range, for example between 0.20 and 60 microns;

heating the powder to a temperature having a value close to its microcrystalline melting point;

cooling the thermally treated material;

breaking the cooled material up into granules;

forming the granulated material into a bar having a substantially cylindrical outer surface;

applying a substantially radial compressive force to the bar over the full length thereof;

relieving the bar of said radial compressive force;

heating the compressed granulated material to a temperature above its microcrystalline melting point to cause unrestrained expansion of, the compressed granulated material and cooling the thermally treated material, the extent of the radial compression being such that, on said subsequent heating of the previously compressed granulated material, the material expands predominantly in a direction opposite to that of the compressive force and the granules fuse together to produce a non-fibrillated material the pores of which, within any cylindrical surface contained within the bar and centred about the central longitudinal axis thereof, are of substantially uniform size and are substantially uniformly distributed within that surface.

The process may further comprise the step of forming a film from the cooled bar the plane of which film is perpendicular to the direction of the radial compressive force whereby the pores within any plane substantially perpendicular to the thickness of the film are of substantially uniform size and are substantially uniformly distributed within that plane and all such parallel planes.

The cooled material may be broken up into granules of irregular shape the maximum diameter of which is of the order of 400 microns, preferably 250 microns and more preferably 100 microns.

Conveniently the granules, prior to compression, have a bulk density of between 300 and 700 grams/liter.

In one process according to the invention the compressive force is applied radially inwardly of the bar on the substantially cylindrical outer surface thereof.

In a further process according to the invention, the bar is of substantially annular shape in transverse section and the compressive force is applied radially outwardly of the bar on the substantially cylindrical inner surface thereof.

In a still further process according to the invention the bar is of substantially annular shape in transverse section and compressive forces are applied both radially inwardly and radially outwardly of the bar on the substantially cylindrical outer and inner surfaces thereof respectively.

The compressive force applied to the granulated material may be within the range 40 to 900 kgm/cm$^2$ depending upon the nature of the material and the desired porosity and strength of the resultant product.

The microcrystalline melting point of untreated PTFE powder is about 340° C., and the temperature of the initially heated powder is preferably within a few degrees of this value, either above or below this value, typically within the range of 300° C. to 360° C.

After the first heat treatment, the microcrystalline melting point of the material will have fallen, and the second heat treatment following compression of the granulated material is carried out to a temperature above this value, typically to about 380° C. when expansion of the material occurs predominantly in a direction opposite to that of the previously applied pressure.

Cooling of the material after both the initial and second heating treatments may be carried out slowly or by quenching depending upon the desired properties of the end product.

A film of material may be produced from the cylindrical bar by subjecting the bar to a knifing or skiving treatment with a blade extending parallel with the central longitudinal axis of the bar, while the film of material so formed may be laminated to a sheet of hydrophilic material.

DESCRIPTION OF THE PREFERRED EMBODIMENTS

Figure 1:
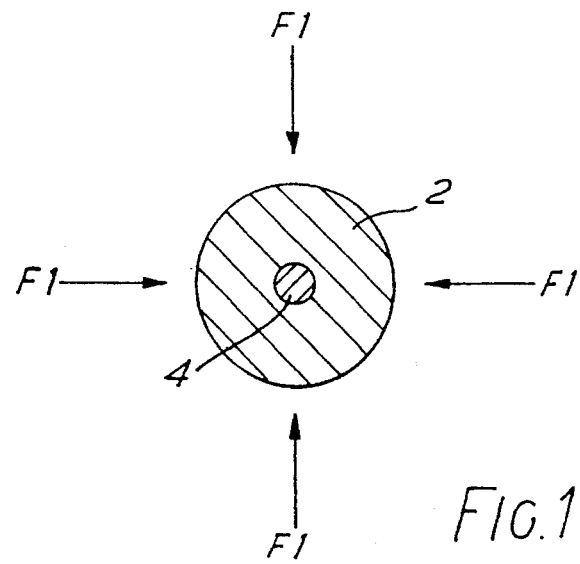
FIG. 1 is a transverse section through a cylindrical mass of granulated material during the compression step of one process according to the invention.

PTFE powders are supplied in a range of particle sizes and shapes ranging from small, irregularly shaped particles of up to perhaps 60 microns in diameter, to larger substantially spherical particles of several hundred microns in diameter. The preferred particles for treatment in accordance with the process of the invention are the smaller particles of previously untreated PTFE of between 0.20 and 60 microns in diameter and of irregular shape.

A quantity of such material is carefully disaglomerated by means of a vibrating seive technique and is then poured onto a suitable tray. The powder is then heated to a temperature close to its microcrystalline melting point of about 340° C., typically to a temperature within a few degrees above or below this value, for example between 320° C. and 360° C., resulting in the individual particles of the material not fusing completely together but remaining compressible. This can be contrasted with normal sintering of PTFE which is carried out well above said melting point, typically at a temperature of about 360° C., with the result that the particles of the material coalesce into a substantially translucent gel.

The heated material is cooled in a controlled manner, either slowly or by quenching, the rate of cooling influencing the properties of the final product.

The resultant relatively soft mass is then broken up into granules by any one of various grinding techniques and, before further processing, may be seived into fractions of different granule sizes. The granule size at this stage has a great bearing on the pore size of the finished material. Processing a fraction of material containing granules within a narrow range of sizes will result in a material having a narrow range of pore sizes therein A preferred working range of granular sizes is between 100 and 250 microns, although the granules may have a maximum diameter if up to of the order of 400 microns The granules are of spiky, irregular shape and may have a bulk density of between 300 and 700 grams/liter, preferably between 500 and 600 grams/liter.

This granular material is then placed into a compression device comprising a hollow metal cylinder housing a cylindrical flexible rubber sleeve surrounding a central, axially-extending mandrel.

More particularly, the granulated material is placed into the rubber sleeve to surround the mandrel, and fluid under pressure is forced into the annular space between the inner wall of the metal housing and the rubber sleeve. The cylinder of granulated material so formed within the sleeve is thus compressed by a uniform radial force applied thereto by way of the rubber sleeve over the whole of the surface area of the sleeve, the pressures involved typically being up to 900 kgm/cm$^2$. This can be compared with pressures applied in normal treatments of PTFE which are typically of the order of 150 to 300 kgm/cm$^2$, as pressures greater than this can cause cracking of the hard PTFE—in such known treatments, if a porous product is required, the material would normally have to be under-compressed, as pressures of even 150 to 300 kgm/cm$^2$ are sufficient virtually to eliminate voids.

The cylinder of compressed granular material is removed from the compression device and, after this compression stage, retains a 'plastic memory' of its structure prior to compression, the microcrystalline melting point of the material having fallen to, typically, about 327° C. as a result of the initial heat treatment.

The cylinder of granular material is then placed in an oven and is again heated, this time to a temperature well above its current microcrystalline melting point, typically to about 380° C. During this heating stage, the granules fuse together and a large expansion of the material occurs predominantly in a direction opposite to that of the applied pressure during compression—i.e. radially outwardly—with some expansion in the axial direction also.

Cooling of the material is then effected in a controlled manner either slowly or by quenching dependent upon the desired properties of the resultant product, quenching resulting in a more porous material then slow cooling.

Thus there is produced a cylinder of non-fibrillated microporous PTFE, in which the nodes of material merge or fuse into one another to define a matrix of pores which, in any cylindrical surface within the material and centred about the central longitudinal axis of the cylinder, are of uniform size and are uniformly distributed in that surface and in any concentric surface.

In a preferred application of the invention, the cylinder of material is skived into a continuous thin film by means of a knife-blade extending axially of the cylinder and co-acting substantially tangentially with the external surface of the cylinder as it is rotated on a central mandrel.

The formation of such a film the plane of which is substantially perpendicular to the direction of the compression forces ensures that the pores within any plane substantially perpendicular to the thickness of the film are of substantially uniform size and are substantially uniformly distributed within that plane and all such parallel planes.

The preferred thickness of the films of material according to the invention falls within the range of 50 microns to 200 microns, while the preferred sizes of the pores may range from less than one micron up to about 10 microns.

As well as being interconnected in said aforementioned planes, the nodes of PTFE are also interconnected throughout the thickness of the film to define a complex three-dimensional dimensional matrix with much larger pore diameters and relatively non-uniform distribution of pores in planes parallel with the thickness of the film—i.e. perpendicular to main plane of the film.

Thus it will be appreciated that the material of the invention, not being fibrillated in any dimension, differs significantly from axially fibrillated material which is necessarily relatively weak in one plane and is therefore prone to easy and undesirable deformation.

Indeed material according to the invention combines porosity with strength, and shows excellent uniformity of pore size, with water vapour transmission values up to about 20,000 grams/24 hours/square meter.

The material of the invention therefore has ideal application in, for example, liquid and gaseous diffusion and filtration processes, as well as in the textile industry.

In this latter respect, mercury intrusion studies of the surface of the material so formed, as well as electron microscopy, reveal that the pores are substantially funnel-shaped, being wider at the surface of the material and tapering inwardly thereof. If the size of the entrances to the pores at the surface of the material, as opposed to the size of the internal pore structure, is about 10 microns or less, the surface is non-composite and can be penetrated by water. If the size of the entrances to the pores at the surface of the material is greater than about 10 microns, a composite surface results in which water can only contact the high points of the surface, thus trapping air in the surface and whereby a surface with increased hydrophobicity results.

A further indication of the strength of the porous material according to the invention is achieved by forcing mercury into the pores of the material under gradually increasing pressure, it being observed that the mercury occupies a cumulative volume within the material, and that, on slow release of the pressure, the mercury exudes therefrom with a lag or hysterisis. This test illustrates that the material retains its internal structure despite the presence of the mercury under pressure, and this can be compared with the reaction of axially-fibrillated PTFE to the same test, such material giving up all the mercury immediately on release of the pressure even if said pressure is relatively low and illustrating that the internal pore structure is easily destroyed.

The surface morphology of the non-fibrillated, microporous PTFE of the invention is such as to allow adhesion to a wide range of other surfaces without the usual surface preparation for normal, non-porous PTFE. The material can be vulcanised to substrates without the use of adhesives, while, in the textile field, the material in this film form can be laminated to one or more sheets of textile material such as polyester.

Unlike in the production of non-porous PTFE, solids may be deposited within the porous material by absorption of solutions, said solid material subsequently being precipitated within the body of the matrix to provide electrically-conducting characteristics to the material.

The process for production of non-fibrillated, microporous PTFE according to the invention may be varied somewhat from that detailed above. For example, in addition to applying a radially-inwardly directed compressive force to the outer surface of the cylinder of granular material within the compression device, a radially-outwardly directed compressive force could be applied within the hollow cylindrical interior of the mass of granular material. In such a case, the solid central mandrel of the above-detailed compression device is replaced by a further flexible rubber sleeve centrally within the granular material and to the hollow interior of which is supplied fluid under pressure whereby the required, radially-outwardly directed compressive force is applied to the granular material by way of the flexible sleeve.

A combination of radially-inwardly directed and radially-outwardly directed compressive forces is particularly useful when substantial quantities of granular material are being treated and the thickness of the annulus of material within the compression device is such that radial forces in one direction only may be dissipated through said thickness.

Referring to the drawings, FIG. 1 shows a cylinder of granulated material 2 surrounding a central mandrel 4, a radially-inwardly directed compressive force being applied to the cylindrical mass over the whole of the surface area thereof as indicated by the arrows F1.

Figure 2:
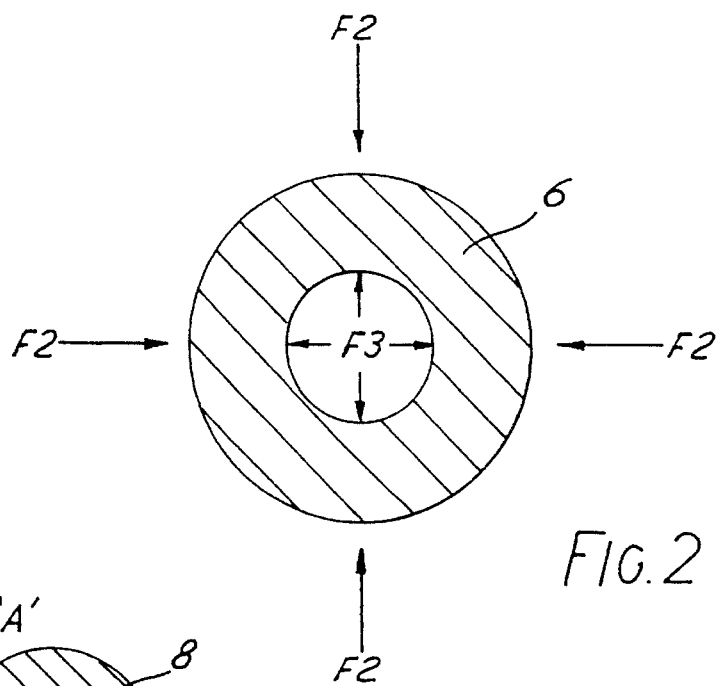
FIG. 2 is a transverse section through a mass of granulated material during the compression step of another process according to the invention.

FIG. 2 illustrates a mass of granulated material 6 of annular cross-section, radially-inwardly and radially-outwardly directed compressive forces F2 and F3 being applied to the outer and inner cylindrical surfaces respectively of said mass.

Figure 3:
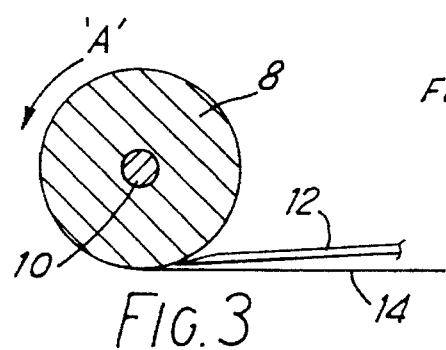
FIG. 3 is a transverse section through a cylindrical bar according to the invention undergoing knifing or skiving.
Figure 4:
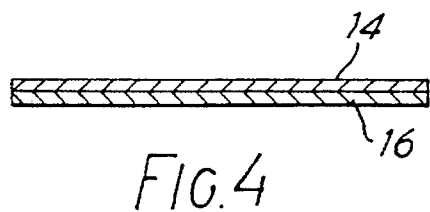
FIG. 4 shows a film of material according to the invention laminated to a layer of hydrophilic material.

In FIG. 3, a cylindrical bar of non-fibrillated, microporous PTFE formed according to the process of the invention is shown at 8 mounted on a central, rotatable mandrel 10, a knife-blade 12 extending longitudinally of the bar co-acting substantially tangentially with the external surface of the bar whereby, on rotation of the bar 8 in the direction of arrow 'A', a thin film 14 of material is formed.

This film 14 may be laminated to a thin layer of hydrophilic textile material 16 such as polyester.

What I claim and desire to secure by Letters Patent is:

1. A process for producing a film from a non-fibrillated, microporous PTFE having a substantially cylindrical outer surface, said process comprising the steps off providing thermally and compressively untreated PTFE powder the particles of which are of irregular shape and are of a diameter between 0.20 and 60 microns;

disagglomerating said powder;

heating the disagglomerated powder to a temperature having a value close to its microcrystalline melting point to form a thermally treated material;

cooling the thermally treated material to form a cooled material;

breaking the cooled material up into granules to form an irregular granulated material;

forming the irregular granulated material into a bar having a substantially cylindrical outer surface and a central longitudinal axis;

applying a compressive force to the bar radially inwardly of the bar on the substantially cylindrical outer surface thereof and over the full length thereof;

relieving the bar of said radial compressive force;

heating the compressed granulated material to a temperature above its microcrystalline melting point to cause unrestrained expansion of the compressed granulated material in all directions to form a further thermally treated material, the extent of the radial compression being such that, on said subsequent heating of the previously compressed granulated material, the material expands predominantly in a direction opposite to that of the compressive force and the granules fuse together to produce a non-fibrillated material the pores of which, within any cylindrical surface contained within the bar and centered about the central longitudinal axis thereof, are of substantially uniform size and are substantially uniformly distributed within that surface;

cooling the further thermally treated material; and skiving the cooled thermally treated material to form a film, the plane of the film being perpendicular to the direction of the radial compressive force whereby the pores within any plane substantially perpendicular to the thickness of the film are of substantially uniform size and are substantially uniformly distributed within that plane and all such parallel planes.

2. A process as claimed in claim 1 in which the granules, prior to compression, have a bulk density of between 300 and 700 grams/liter.

3. A process as claimed in claim 1 in which the bar is of substantially annular shape in transverse section, a compressive force also being applied radially outwardly of the bar on the substantially cylindrical inner surface thereof.

4. A process as claimed in claim 1 in which the granulated material is compressed at a pressure within the range 40 to 900 kgm/cm$^2$.

5. A process as claimed in claim 1 in which the powder is initially heated to a temperature within the range 320° C. to 360° C. and in which the second heating is carried out to a temperature of the order of 380° C.

6. A process as claimed in claim 1 in which the film is formed by knifing the bar of material with a blade extending parallel with the central longitudinal axis of the cylinder.

7. A process as claimed in claim 1 and further comprising the step of laminating the film of material so formed to a sheet of hydrophilic material.

8. A film of non-fibrillated microporous PTFE produced by a process as claimed in claim 1.

9. A process according to claim 1 wherein said skiving forms a film having a thickness of 50 to 200 microns.

10. A process according to claim 1, wherein said skiving forms a film having pore size of less than one micron to about 10 microns.

* * * * *